US011525099B2

(12) United States Patent
Champagne (10) Patent No.: US 11,525,099 B2
(45) Date of Patent: Dec. 13, 2022

(54) COMPOSITION FOR COOLING AND LUBRICATING A PROPULSION SYSTEM OF AN ELECTRIC OR HYBRID VEHICLE

(71) Applicant: TOTAL MARKETING SERVICES, Puteaux (FR)

(72) Inventor: Nicolas Champagne, Puteaux (FR)

(73) Assignee: Total Marketing Services, Puteaux (FR)

( * ) Notice: Subject to any disclaimer, the term of this patent is extended or adjusted under 35 U.S.C. 154(b) by 0 days.

(21) Appl. No.: 17/256,693

(22) PCT Filed: Jul. 2, 2019

(86) PCT No.: PCT/EP2019/067721
§ 371 (c)(1),
(2) Date: Dec. 29, 2020

(87) PCT Pub. No.: WO2020/007853
PCT Pub. Date: Jan. 9, 2020

(65) Prior Publication Data
US 2021/0139805 A1    May 13, 2021

(30) Foreign Application Priority Data
Jul. 2, 2018    (FR) ..................... 1856093

(51) Int. Cl.
*C22C 33/00* (2006.01)
*C10M 129/74* (2006.01)
(Continued)

(52) U.S. Cl.
CPC ........ *C10M 129/74* (2013.01); *C10M 169/04* (2013.01); *H01M 10/0525* (2013.01);
(Continued)

(58) Field of Classification Search
CPC .............. C10M 129/74; C10M 169/04; C10M 2203/003; C10M 2207/283;
(Continued)

(56) References Cited

U.S. PATENT DOCUMENTS 3,003,968 A    10/1961   Bruce et al.
10,336,961 B2    7/2019   Nakada et al.
(Continued)

FOREIGN PATENT DOCUMENTS

EP    1520904 A1    4/2005
EP    3385358 A1    6/2020
(Continued)

OTHER PUBLICATIONS

International Search Report received from the European Patent Office in International Application No. PCT/EP2019/067721 dated Aug. 1, 2019.
(Continued)

*Primary Examiner* — Prem C Singh
*Assistant Examiner* — Francis C Campanell
(74) *Attorney, Agent, or Firm* — The Marbury Law Group, PLLC (57) ABSTRACT

The present invention relates to the use, for cooling and lubricating a propulsion system of an electric or hybrid vehicle, of a composition comprising: (i) at least one base oil; and (ii) at least one diester of formula $R^a$—C(O)—O—$([C((R)_2)]_n$—O$)_s$—C(O)—$R^b$ (I), different than the base oil (i).

The invention also relates to a method of cooling and lubricating a propulsion system of an electric or hybrid vehicle comprising at least one step of bringing at least one mechanical component of said system into contact with a composition as defined above.

14 Claims, 1 Drawing Sheet

(51) Int. Cl.
| | |
|---|---|
| *H01M 10/613* | (2014.01) |
| *H01M 10/625* | (2014.01) |
| *H01M 10/6568* | (2014.01) |
| *C10M 169/04* | (2006.01) |
| *H01M 10/0525* | (2010.01) |
| *H01M 10/30* | (2006.01) |
| *C10N 30/02* | (2006.01) |
| *C10N 40/14* | (2006.01) |
| *C10N 40/25* | (2006.01) |

(52) U.S. Cl.
CPC ......... *H01M 10/30* (2013.01); *H01M 10/613* (2015.04); *H01M 10/625* (2015.04); *H01M 10/6568* (2015.04); *C10M 2203/003* (2013.01); *C10M 2207/283* (2013.01); *C10N 2030/02* (2013.01); *C10N 2040/14* (2013.01); *C10N 2040/25* (2013.01); *H01M 2220/20* (2013.01)

(58) Field of Classification Search
CPC .......... C10M 2207/046; C10M 105/38; H01M 10/613; H01M 10/625; H01M 10/6568; H01M 10/0525; H01M 10/30; H01M 2220/20; C10N 2030/02; C10N 2040/14; C10N 2040/25; C10N 2040/17; C10N 2040/30; Y02E 60/10; Y02T 10/70
USPC .......................................... 420/129; 508/315
See application file for complete search history.

(56) References Cited

U.S. PATENT DOCUMENTS

| | | | |
|---|---|---|---|
| 10,982,169 | B2 | 4/2021 | Broutin et al. |
| 11,162,047 | B2 | 11/2021 | Champagne et al. |
| 2011/0034358 | A1* | 2/2011 | Komatsubara ....... C10M 169/04 508/459 |
| 2012/0053100 | A1 | 3/2012 | Radano et al. |
| 2012/0264661 | A1* | 10/2012 | Tsubouchi ........... C10M 105/04 508/110 |
| 2012/0283162 | A1 | 11/2012 | Tsubouchi |
| 2013/0005622 | A1 | 1/2013 | Lyon et al. |
| 2014/0274840 | A1 | 9/2014 | Esche et al. |
| 2016/0289591 | A1 | 10/2016 | Fujiwara et al. |
| 2017/0022441 | A1 | 1/2017 | Onodera et al. |
| 2018/0100115 | A1* | 4/2018 | Gao ..................... C10M 171/02 |
| 2018/0100119 | A1* | 4/2018 | Aoyama ............... C10M 145/14 |
| 2018/0245014 | A1 | 8/2018 | Nakada et al. |
| 2019/0078036 | A1 | 3/2019 | Broutin et al. |
| 2019/0249102 | A1 | 8/2019 | Martin et al. |
| 2021/0380898 | A1 | 12/2021 | Champagne et al. |

FOREIGN PATENT DOCUMENTS

| | | |
|---|---|---|
| GB | 716086 | 9/1954 |
| JP | 2012/184360 A | 9/2012 |
| WO | 2011/113851 A1 | 9/2011 |
| WO | 2015/116496 A1 | 8/2015 |
| WO | 2016/152463 A1 | 9/2016 |
| WO | 2017/157892 A1 | 9/2017 |
| WO | 2017/157979 A1 | 9/2017 |
| WO | 2018/078290 A1 | 5/2018 |
| WO | 2019/025446 A1 | 2/2019 |
| WO | 2020/094546 A1 | 5/2020 |

OTHER PUBLICATIONS

Written Opinion of the International Search Report received from the European Patent Office in International Application No. PCT/EP2019/067721 dated Jul. 2, 2019.
International Search Report received from the European Patent Office in International Application No. PCT/EP2019/080044, dated Jan. 28, 2020.
Written Opinion of the International Search Authority in International Application No. PCT/EP2019/080044, dated Jan. 28, 2020.
Non-Final Office Action for copending U.S. Appl. No. 17/291,118, dated Jan. 27, 2022.
Final Office Action for copending U.S. Appl. No. 17/291,118, dated Jul. 13, 2022.

* cited by examiner

COMPOSITION FOR COOLING AND LUBRICATING A PROPULSION SYSTEM OF AN ELECTRIC OR HYBRID VEHICLE

CROSS REFERENCE TO RELATED APPLICATIONS

This application in a National Phase Application claiming priority to International Application No. PCT/EP2019/067721 filed Jul. 2, 2019 which claims priority to French Application No. 1856093, filed on Jul. 2, 2018, both of which are incorporated by reference herein in their entirety.

The present invention relates to the field of lubricant compositions for a propulsion system of an electric or hybrid vehicle. It thus aims to propose a composition having both properties of lubrication with respect to the transmission of the propulsion system, of cooling of the power electronics and battery, and the two properties combined with respect to the motor in a propulsion system of an electric or hybrid vehicle.

The evolution of international standards for reducing $CO_2$ emissions, but also for lowering energy consumption, is encouraging car manufacturers to propose solutions that are alternatives to combustion engines.

One of the solutions identified by car manufacturers consists of replacing combustion engines with electric motors. Research for reducing $CO_2$ emissions has therefore led to the development of electric vehicles by a number of car companies.

"Electric vehicle" means, in the sense of the present invention, a vehicle comprising an electric motor as the sole means of propulsion, in contrast to a hybrid vehicle, which comprises a combustion engine and an electric motor as combined means of propulsion.

"Propulsion system" means, in the sense of the present invention, a system comprising the mechanical components necessary for the propulsion of an electric vehicle. The propulsion system thus includes more particularly an electric motor, or the rotor-stator assembly of the power electronics (dedicated to the regulation of speed), a transmission and a battery.

Generally, it is necessary to employ, in electric or hybrid vehicles, compositions for meeting the dual constraint of lubrication and cooling of the various components of the propulsion system mentioned above.

Regarding the electric motor itself, the lubricant composition plays a combined role of lubrication and cooling. Regarding the power electronics, the composition provides cooling. The transmission is lubricated by the composition and finally the batteries are cooled by said composition.

A composition as defined according to the invention plays a combined role of lubrication and cooling.

Lubricant compositions, also called "lubricants", are commonly used in motors for the main purposes of reducing the frictional forces between the various moving metal parts in motors. They are in addition effective for preventing premature wear or even damage of these parts, and in particular of their surface.

For this purpose, a lubricant composition consists conventionally of one or more base oils, which are generally combined with several additives designed to stimulate the lubrication performance of the base oils, for example such as friction modifier additives.

Moreover, electric propulsion systems generate heat during operation, from the electric motor, the power electronics and the batteries. As the quantity of heat generated is greater than the quantity of heat normally dissipated to the environment, it is necessary to provide cooling of the motor, the power electronics and the batteries. Generally cooling is carried out on several parts of the propulsion system generating heat and/or the parts of said system that are sensitive to heat, in order to avoid reaching dangerous temperatures, and notably the power electronics and the batteries.

Furthermore, for obvious safety reasons, it is important that the fluid for cooling an electric propulsion system has low flammability.

Conventionally, it is known to cool electric motors with air, with water optionally combined with glycol, or with an oil jet.

Document WO 2011/113851 describes the use of a lubricant composition comprising a base oil, preferably a polyalphaolefin (PAO) or GTL, for cooling an electric motor of a hybrid vehicle or of a vehicle equipped with a kinetic energy recovery system (KERS). However, the compositions described are optimized for motors of hybrid vehicles or of KERS systems, and their cooling properties will not be adequate for use in a fully electric drive system. In fact, a motor of an electric vehicle is subjected to much larger stresses than an electric motor of a hybrid vehicle, owing to a higher frequency of use, which requires the use of an oil with enhanced cooling properties.

We may also cite document JP 2012/184360, which describes a lubricant composition comprising a synthetic base oil and a fluorinated compound for cooling an electric motor. However, the hydrochlorofluorocarbons present in these compositions are organic gases that have a significant negative impact on the ozone layer and are powerful greenhouse gases. The fluorinated gases are also subject to several regulations that aim to limit their use substantially.

It is true that document GB 716 086 dating from 1951 proposes employing a diester in lubricant compositions. However, this use is considered in a context that is very different from that of the invention. Firstly, the lubricant compositions considered in patent GB 716 086 do not conform to those considered according to the invention and are notably intended to be used in aircraft engines, which are exposed to very large temperature variations. The synthetic esters are described there as being more useful than mineral oils insofar as they possess higher viscosity indexes and flash points, and lower pour points than the mineral oils of comparable viscosity.

For obvious reasons of economy and ease of use, it would be advantageous to have a composition allowing the needs for lubrication and cooling of a propulsion system of an electric or hybrid vehicle to be met simultaneously.

Unfortunately, these two properties, lubrication and cooling, at first glance impose opposite constraints. In fact, for optimal cooling of an electric motor, it is known to employ products, such as water, that are as fluid as possible. Now, such fluids do not provide a good level of lubrication. Conversely, compositions of high viscosity, able to provide a good level of lubrication and protection of parts in contact against wear, do not have a satisfactory cooling potential.

The present invention precisely aims to propose a new composition allowing the lubrication and cooling of the aforementioned elements of the propulsion system to be satisfied simultaneously.

More precisely, the inventors discovered that it is possible to provide the multiple function of lubrication and cooling of a propulsion system of an electric or hybrid vehicle, using at least diester of formula (I) as defined hereunder, in a lubricant composition.

The composition thus formed may thus be brought into direct contact with the propulsion system, to cool the motor, the power electronics and the battery by means of this direct contact of said composition on these parts, while also providing lubrication thereof.

The composition thus in direct contact with these parts provides better cooling than conventional air cooling, and water cooling with indirect contact. This bringing into direct contact allows better heat dissipation.

In fact, air cooling allows direct cooling, but air is a very poor fluid for heat dissipation. Conversely, water is a high-performance fluid for cooling but is incompatible with direct contact with the motor, the power electronics and the battery.

Thus, according to a first aspect, the present invention relates to the use, for cooling and lubricating a propulsion system of an electric or hybrid vehicle, of a composition comprising at least:
(i) at least one base oil; and
(ii) at least one diester of formula (I), different than the base oil (i):

(I)

in which:
R represent, independently of one another, a hydrogen atom or a $(C_1-C_5)$alkyl group, linear or branched, in particular a methyl, ethyl or propyl group, notably methyl;
s has a value of 1 or 2;
n has a value of 1, 2 or 3; it being understood that, when s is different from 1, n may be identical or different; and
$R^a$ and $R^b$, which may be identical or different, represent independently of one another, hydrocarbon groups, saturated or unsaturated, linear or branched, having a linear chain with 2 to 11 carbon atoms, preferably with 3 to 8 carbon atoms;
provided that, when s has a value of 2 and n, which are identical, have a value of 2, at least one of the groups R represents a $(C_1-C_5)$alkyl group, linear or branched; and provided that, when s has a value of 1 and n has a value of 3, at least one of the groups R bound to the carbon in the beta position of the oxygen atoms of the ester functions represents a hydrogen atom.

More particularly, the lubricant composition, with said additives, is intended to be brought into direct contact with the batteries of electric vehicles, notably Li-ion or Ni—Cd batteries, which are notably immersed or semi-immersed, static or circulating, in said lubricant composition with additives, or composition employed according to the invention, or else sprayed directly in the form of oil spray, jet, or mist.

A composition as defined according to the invention allows efficient cooling of the battery present in an electric or hybrid vehicle.

The cooling properties of an ester required according to the invention can be determined by measuring the thermal conductivity, denoted A, and the heat capacity, denoted Cp, of said ester.

The thermal conductivity characterizes the behavior of a material during heat transfer by conduction. It represents the energy (quantity of heat) transferred per unit area and unit time under a temperature gradient of 1 kelvin per meter. The higher the thermal conductivity, the more the material is a conductor of energy and will have the capacity to dissipate heat.

Thermal conductivity can be measured according to standard ASTM D7896.

Heat capacity (or calorific capacity) makes it possible to quantify the capacity of a body to absorb or restore energy by heat exchange during a temperature change. The higher the heat capacity, the more the body is a conductor of energy and will have the capacity to dissipate heat.

Heat capacity can be measured by differential scanning calorimetry (DSC) according to standard ASTM E1269.

The inventors found, surprisingly, that the diesters of formula (I) required according to the invention have high values of conductivity and heat capacity, as demonstrated in example 1 hereunder.

In fact, the values obtained demonstrate that a diester of formula (I) as defined above has the capacity to dissipate heat effectively. Its use in a composition comprising at least one base oil thus makes it possible to endow said composition with properties of cooling the parts with which it is in contact, in particular a battery of an electric or hybrid vehicle.

A composition employed according to the invention is moreover able to provide lubrication of the propulsion system of an electric or hybrid vehicle, and more particularly the electric motor itself and the transmission.

Advantageously, a composition as defined according to the invention makes it possible to provide lubrication of the transmission, in particular the reduction gearing, of an electric or hybrid vehicle.

Thus, this single composition employed according to the invention makes it possible to provide both cooling of the motor, the power electronics and the battery, notably an Li-ion or Ni—Cd battery, as well as lubrication of the electric motor and transmission, in particular reduction gearing, in an electric or hybrid vehicle.

Furthermore, the use of at least one diester of formula (I) as defined above in at least one base oil advantageously makes it possible to increase the flammability temperature of the base oil.

Thus, a composition employed according to the invention has a quite particularly advantageous high-temperature flammability.

Also advantageously, the use of at least one diester of formula (I) as defined above, in at least one base oil, makes it possible to increase the life of said composition.

In fact, it is known that prolonged use of a lubrication and/or cooling composition induces a reduction in volume of composition due to its evaporation, and therefore degradation of the properties of said composition over time.

Now, the inventors found, surprisingly, that, as demonstrated in example 2 hereunder, a diester of formula (I) required according to the invention has higher evaporation times, and therefore a lower volatility, compared to those observed for diesters not according to the invention, in particular corresponding to formula (I) defined above for which s would have a value of 3.

Volatility can be measured by thermogravimetric analysis, or TGA, according to standard ASTM D6375.

Thus, a diester of formula (I) according to the invention endows a composition, in which it is used, with advantageous properties, in particular of lubrication and of cooling, over a longer time of use, thereby extending the oil-changing interval. This criterion is particularly important for the parts of the propulsion system that are difficultly accessible and for which oil changes may prove complex, such as batteries.

Therefore, according to another of its aspects, the present invention relates to the use of a diester of formula (I) as defined above, in a composition for cooling and lubricating a propulsion system of an electric or hybrid vehicle, comprising at least one base oil, to increase the oil-changing interval of the propulsion system, in particular the battery thereof.

The present invention further relates to a method of cooling and lubricating a propulsion system of an electric or hybrid vehicle, comprising at least one step of bringing at least one mechanical component of said system into contact with a composition as described according to the invention. Other features, variants and advantages of using a composition defined according to the invention will become clearer on reading the description and the FIGURE given hereunder.

Hereinafter, the expressions "between and . . . ", "ranging from . . . to . . . " and "varying from . . . to . . . " are equivalent and are intended to signify that the limits are included, unless stated otherwise.

Unless stated otherwise, the expression "comprising a/one" is to be understood as "comprising at least a/one".

Composition

As stated above, a composition employed according to the invention comprises at least (i) a base oil or fluid base as explained hereunder, and (ii) at least one diester of formula (I) defined in detail hereunder.

More particularly, a composition employed according to the invention may have a kinematic viscosity, measured at 100° C. according to standard ASTM D445, between 2 and 8 mm²/s, preferably between 3 and 7 mm²/s.

Advantageously, a lubricant composition employed according to the invention may be of a grade according to the SAEJ300 classification defined by the formula (X)W(Y), in which X represents 0 or 5; and Y represents an integer from 4 to 20, in particular from 4 to 16 or from 4 to 12.

Base Oil

A composition employed according to the invention comprises at least one base oil, in particular a fluid base formed from one or more base oils, having a kinematic viscosity, measured at 100° C. according to standard ASTM D445, from 1.5 to 8 mm²/s, in particular from 1.5 to 6.1 mm²/s, more particularly from 1.5 to 4.1 mm²/s, even more particularly from 1.5 to 2.1 mm²/s.

This base oil may be a mixture of several base oils, namely a mixture of 2, 3 or 4 base oils.

Hereinafter, the designation "fluid base" will denote the oil or the mixture of base oils having a kinematic viscosity measured at 100° C. according to standard ASTM D445 from 1.5 to 8 mm²/s.

The base oil present in a lubricant composition employed according to the invention may be selected from the oils of mineral or synthetic origin belonging to groups I to V according to the classes defined in the API classification (or their equivalents according to the ATIEL classification) and presented in Table A below or mixtures thereof, provided that the oil or the mixture of oils has the desired viscosity stated above.

TABLE A

| | Saturates content | Sulfur content | Viscosity index (VI) |
|---|---|---|---|
| Group I Mineral oils | <90% | >0.03% | 80 ≤ VI < 120 |
| Group II Hydrocracked oils | ≥90% | ≤0.03% | 80 ≤ VI < 120 |
| Group III Hydrocracked or hydro-isomerized oils | ≥90% | ≤0.03% | ≥120 |

TABLE A-continued

| | Saturates content | Sulfur content | Viscosity index (VI) |
|---|---|---|---|
| Group IV | Polyalphaolefins (PAO) | | |
| Group V | Esters and other bases not included in groups I to IV | | |

The mineral base oils include all types of base oils obtained by atmospheric and vacuum distillation of crude oil, followed by refining operations such as solvent extraction, deasphalting, solvent dewaxing, hydrofining, hydrocracking, hydroisomerization and hydrofinishing.

Mixtures of synthetic and mineral oils, which may be biosourced, may also be used.

Generally there is no limitation regarding the use of different base oils for preparing the compositions employed according to the invention, except that they must, besides meeting the aforementioned viscosity criterion, have properties, notably of viscosity index, sulfur content or resistance to oxidation, suitable for use for propulsion systems of an electric or hybrid vehicle.

The base oils of the compositions employed according to the invention may also be selected from synthetic oils, such as certain esters of carboxylic acids and of alcohols, polyalphaolefins (PAOs), and polyalkylene glycols (PAGs) obtained by polymerization or copolymerization of alkylene oxides comprising from 2 to 8 carbon atoms, in particular from 2 to 4 carbon atoms.

The PAOs used as base oils are for example obtained from monomers comprising from 4 to 32 carbon atoms, for example from octene or decene.

The weight-average molecular weight of the PAO may vary quite widely. Preferably, the weight-average molecular weight of the PAO is below 600 Da. The weight-average molecular weight of the PAO may also range from 100 to 600 Da, from 150 to 600 Da, or from 200 to 600 Da.

For example, the PAOs used in the context of the invention, having a kinematic viscosity, measured at 100° C. according to standard ASTM D445, from 1.5 to 8 mm²/s are sold commercially by Ineos under the brands Durasyn® 162, Durasyn® 164, Durasyn® 166 and Durasyn® 168.

Advantageously, the base oil or oils of the composition employed according to the invention are selected from the polyalphaolefins (PAOs).

Preferably, a composition employed according to the invention comprises a fluid base formed from one or more base oils having a kinematic viscosity measured at 100° C. according to standard ASTM D445 between 1.5 and 8 mm²/s.

In other words, a composition employed according to the invention may be free from base oil or mixture of base oils not meeting the criterion of kinematic viscosity measured at 100° C. according to standard ASTM D445, in particular free from oil or mixture of base oils having a viscosity above 9 mm²/s.

A person skilled in the art is able to adjust the content of fluid base to be used in a composition employed according to the invention to achieve the viscosity desired for the composition.

As stated above, the fluid base notably provides the cooling potential of the composition employed according to the invention. In particular, the fluidity of the base notably ensures good cooling properties when using the composition in contact with the batteries of a propulsion system of an electric or hybrid vehicle.

The cooling properties of the composition employed are further enhanced advantageously by the shearing applied to the composition at the level of injection, which brings the fluid to a lower level of viscosity than at rest.

In particular, a composition employed according to the invention comprises 60% to 99.5% by weight, preferably from 70% to 98%, even more preferably from 80% to 98%, advantageously from 90% to 97% by weight of base oil, or mixture of base oils, notably having a kinematic viscosity measured at 100° C. according to standard ASTM D445 from 1.5 to 8 mm²/s, relative to the total weight of the composition.

Diester of Formula (I)

As stated above, a lubricant composition employed according to the invention has for specificity to contain at least one diester of general formula (I), different than the base oil defined above, $$R^a—C(O)—O—([C(R)_2]_n—O)_s—C(O)—R^b \qquad (I)$$

in which:
R represent, independently of one another, a hydrogen atom or a $(C_1-C_5)$alkyl group, linear or branched, in particular a methyl, ethyl or propyl group, notably methyl;
s has a value of 1 or 2;
n has a value of 1, 2 or 3; in particular n has a value of 2 or 3 and more particularly n has a value of 2, it being understood that, when s is different from 1, n may be identical or different; and
$R^a$ and $R^b$, which may be identical or different, represent independently of one another, hydrocarbon groups, saturated or unsaturated, linear or branched, having a linear chain with 2 to 11 carbon atoms, preferably with 3 to 8 carbon atoms;
provided that, when s has a value of 2 and n, which are identical, have a value of 2, at least one of the groups R represents a $(C_1-C_5)$alkyl group, linear or branched; and
provided that, when s has a value of 1 and n has a value of 3, at least one of the groups R bound to the carbon in the beta position of the oxygen atoms of the ester functions represents a hydrogen atom.

According to one embodiment, $R^a$ and $R^b$, which may be identical or different, represent independently of one another, hydrocarbon groups, saturated or unsaturated, linear or branched, comprising from 2 to 11 carbon atoms, preferably from 3 to 8 carbon atoms.

Hereinafter, a diester of formula (I) required according to the invention will be designated more simply as diester of the invention.

Preferably, in the context of the invention:
"$C_{t-z}$" where t and z are integers, means a carbon chain that may have from t to z carbon atoms; for example $C_{1-4}$ a carbon chain that may have from 1 to 4 carbon atoms;
"alkyl" means a linear or branched saturated aliphatic group; for example a $C_{1-4}$-alkyl group represents a carbon chain from 1 to 4 carbon atoms, linear or branched, more particularly a methyl, ethyl, propyl, isopropyl, butyl, isobutyl, tert-butyl.

Preferably, in the aforementioned formula (I), when s is different from 1, all the n are identical.

In particular, n in the aforementioned formula (I) has a value of 2 or 3, and more particularly n has a value of 2.

Preferably, at least one of the groups R represents a $(C_1-C_5)$alkyl group, in particular $(C_1-C_4)$alkyl, linear or branched, more preferably methyl, ethyl or propyl; advantageously methyl.

According to a particularly preferred embodiment, the diester of formula (I) required according to the invention may more particularly be a diester of the following formula (I'):

$$R^a—C(O)—O—([C(R)_2]_n—O)—([C(R')_2]_m—O)_{s-1}—C(O)—R^b \qquad (I')$$

in which:
R and R' represent, independently of one another, a hydrogen atom or a $(C_1-C_5)$alkyl group, linear or branched, in particular a methyl, ethyl or propyl group, notably a methyl group;
s has a value of 1 or 2;
n has a value of 2;
m has a value of 2;
$R^a$ and $R^b$, which may be identical or different, represent independently of one another, hydrocarbon groups, saturated or unsaturated, linear or branched, having a linear chain with 2 to 11 carbon atoms, preferably with 3 to 8 carbon atoms;
provided that, when s has a value of 2, at least one of the groups R or R' represents a $(C_1-C_5)$alkyl group, linear or branched.

Preferably, a diester required according to the invention is of formula (I') in which at least one of the R or R' represents a $(C_1-C_5)$alkyl group, in particular $(C_1-C_4)$alkyl, linear or branched, more preferably methyl, ethyl or propyl; advantageously methyl.

According to a variant embodiment, s in the aforementioned formula (I) or (I') has a value of 2.

In particular, the diester required according to the invention may be of the following formula (I'a):

$$R^a—C(O)—O—([C(R)_2]_n—O)—([C(R')_2]_m—O)—C(O)R^b \qquad (I'a)$$

in which:
R and R' represent, independently of one another, a hydrogen atom or a $(C_1-C_5)$alkyl group, linear or branched, in particular a methyl, ethyl or propyl group, advantageously methyl;
n has a value of 2;
m has a value of 2;
$R^a$ and $R^b$, which may be identical or different, represent independently of one another, hydrocarbon groups, saturated or unsaturated, linear or branched, having a linear chain with 2 to 11 carbon atoms, preferably with 3 to 8 carbon atoms;
provided that at least one of the groups R or R' represents a $(C_1-C_5)$alkyl group, linear or branched, in particular methyl, ethyl or propyl, advantageously methyl.

Preferably, at least one of the groups R represents a $(C_1-C_5)$alkyl group, linear or branched, in particular a methyl, ethyl or propyl group, advantageously methyl; and at least one of the R' represents a $(C_1-C_5)$alkyl group, linear or branched, in particular a methyl, ethyl or propyl group, advantageously methyl.

Even more preferably, the diester of the invention may be of formula (I'a) in which one of the groups R represents a $(C_1-C_5)$alkyl group, linear or branched, in particular a methyl, ethyl or propyl group, advantageously methyl; and one of the groups R' represents a $(C_1-C_5)$alkyl group, linear or branched, in particular a methyl, ethyl or propyl group, advantageously methyl; the other groups R and R' representing hydrogen atoms.

In other words, according to a particular embodiment, the diester of the invention may be of the following formula (I″a):

$$R^a—C(O)—O—CHR^1—CHR^2—O—CHR^3—CHR^4—O—C(O)—R^b \quad \text{(I″a)}$$

in which:
one of the groups $R^1$ and $R^2$ represents a $(C_1\text{-}C_5)$alkyl group, linear or branched, the other one representing a hydrogen atom;
one of the groups $R^3$ and $R^4$ represents a $(C_1\text{-}C_5)$alkyl group, linear or branched, the other one representing a hydrogen atom; and
$R^a$ and $R^b$, which may be identical or different, are as defined above.

In particular, the diester of the invention may be of formula (I″a) in which:
one of the groups $R^1$ and $R^2$ represents a methyl, ethyl or propyl group, advantageously methyl, the other one representing a hydrogen atom; and
one of the groups $R^3$ and $R^4$ represents a methyl, ethyl or propyl group, advantageously methyl, the other one representing a hydrogen atom.

According to another variant embodiment, s in the aforementioned formula (I) or (I') has a value of 1.

In other words, the diester required according to the invention may be of the following formula (I'b):

$$R^a—C(O)—O—([C(R)_2]_n—O)—C(O)—R^b \quad \text{(I'b)}$$

in which:
R represent, independently of one another, a hydrogen atom or a $(C_1\text{-}C_5)$alkyl group, linear or branched, in particular a methyl, ethyl or propyl group, advantageously methyl;
n has a value of 2;
$R^a$ and $R^b$, which may be identical or different, represent independently of one another, hydrocarbon groups, saturated or unsaturated, linear or branched, having a linear chain with 2 to 11 carbon atoms, preferably with 3 to 8 carbon atoms.

Preferably, in the aforementioned formula (I'b), at least one of the R represents a $(C_1\text{-}C_5)$alkyl group, linear or branched, in particular a methyl, ethyl or propyl group, advantageously methyl.

In particular, the diester of the invention may be of formula (I'b) in which one of the groups R represents a $(C_1\text{-}C_5)$alkyl group, linear or branched, in particular a methyl, ethyl or propyl group, advantageously methyl, the other one representing hydrogen atoms.

As stated above, $R^a$ and $R^b$ in the aforementioned formula (I), (I'), (I'a), (I″a) or (I'b), which may be identical or different, represent hydrocarbon groups, saturated or unsaturated, linear or branched, having a linear chain with 2 to 11 carbon atoms, preferably with 3 to 8 carbon atoms.

"Hydrocarbon-containing" group means any group having a carbon atom fixed directly to the rest of the molecule and having mainly an aliphatic hydrocarbon character.

Preferably, $R^a$ and $R^b$ in the aforementioned formula (I), (I'), (I'a), (I″a) or (I'b) have a linear chain of 3 to 6 carbon atoms.

According to a variant embodiment, $R^a$ and $R^b$ in the aforementioned formula (I), (I'), (I'a), (I″a) or (I'b) have a linear chain of 8 to 11 carbon atoms.

"Linear chain of t to z carbon atoms" means a saturated or unsaturated, preferably saturated, carbon chain comprising from t to z carbon atoms one after another, the carbon atoms optionally present at the level of the branches of the carbon chain not being taken into account in the number of carbon atoms (t-z) making up the linear chain.

According to a particular embodiment, in the aforementioned formula (I), (I'), (I'a), (I″a) or (I'b), $R^a$ and $R^b$, which may be identical or different, are of vegetable, animal or petroleum origin.

According to a particular embodiment, in the aforementioned formula (I), (I'), (I'a), (I″a) or (I'b), $R^a$ and $R^b$, which may be identical or different, represent saturated groups.

According to another particularly preferred embodiment, in the aforementioned formula (I), (I'), (I'a), (I″a) or (I'b), $R^a$ and $R^b$, which may be identical or different, represent linear groups.

According to another particular embodiment, in the aforementioned formula (I), (I'), (I'a), (I″a) or (I'b), $R^a$ and $R^b$ represent saturated linear $C_9$ to $C_{11}$, in particular $C_8$ to $C_{10}$, hydrocarbon groups.

In particular, $R^a$ and $R^b$ are identical.

Preferably, $R^a$ and $R^b$ both represent n-octyl or n-undecyl, preferably n-octyl, groups.

According to another particular embodiment, in the aforementioned formula (I), (I'), (I'a), (I″a) or (I'b), $R^a$ and $R^b$ represent branched hydrocarbon groups comprising from 2 to 11 carbon atoms, preferably from 3 to 8 carbon atoms.

According to this variant, $R^a$ and $R^b$ in the aforementioned formula (I), (I'), (I'a), (I″a) or (I'b) preferably have a linear chain of 3 to 7 carbon atoms branched by at least one, preferably one, $C_1$ to $C_6$ hydrocarbon group, preferably a methyl or an ethyl.

In particular, $R^a$ and $R^b$ are identical. Preferably, $R^a$ and $R^b$ both represent 2-methylheptyl or 2-ethylhexyl groups.

The diesters of formula (I) required according to the invention may be commercially available or prepared by methods of synthesis described in the literature and familiar to a person skilled in the art. These methods of synthesis more particularly employ an esterification reaction between a diol compound of formula $HO—([C(R)_2]_n—O)_s—OH$ and compounds of formula $R^a—COOH$ and $R^b—COOH$, where $R^a$ and $R^b$, which may be identical or different, are as defined above.

Of course, it is up to a person skilled in the art to adjust the synthesis conditions to obtain the diesters required according to the invention.

As examples, diesters of the aforementioned formula (I), in particular of the aforementioned formula (I'), may be obtained by an esterification reaction between a mono- or polypropylene glycol, in particular monopropylene glycol (MPG) or dipropylene glycol (DPG), diethylene glycol (DEG), neopentyl glycol (NPG), preferably between dipropylene glycol or diethylene glycol, and one or more suitable carboxylic acids $R^a—COOH$ and $R^b—COOH$, in particular selected from nonanoic acid, dodecanoic acid, isononanoic acid, 2-ethylhexanoic acid, and mixtures thereof.

As an example, a diester or mixture of diesters of formula (I') as defined above, where:
s has a value of 2,
one of the groups R representing a $(C_1\text{-}C_5)$alkyl group, linear or branched, in particular a methyl, ethyl or propyl group, advantageously methyl, the other one representing hydrogen atoms; and
one of the groups R' representing a $(C_1\text{-}C_5)$alkyl group, linear or branched, in particular a methyl, ethyl or propyl group, advantageously methyl, the other one representing hydrogen atoms,
may be obtained by an esterification reaction between dipropylene glycol (DPG) and one or more suitable carboxylic acids $R^a—COOH$ and $R^b—COOH$.

A diester of formula (I') as defined above, where
s has a value of 1,
one of the groups R representing a ($C_1$-$C_5$)alkyl group, linear or branched, in particular a methyl, ethyl or propyl group, advantageously methyl, the other one representing hydrogen atoms,
may be obtained by an esterification reaction between monopropylene glycol (MPG) and one or more suitable carboxylic acids $R^a$—COOH and $R^b$—COOH.

In particular, in the case when $R^a$ and $R^b$ both represent n-octyl or n-undecyl groups, said diester or mixture of diesters may thus be obtained by an esterification reaction between monopropylene glycol or dipropylene glycol and nonanoic acid or dodecanoic acid.

According to one embodiment, a diester or diester mixture required according to the invention may be obtained by an esterification reaction between dipropylene glycol and nonanoic acid, dodecanoic acid and mixtures thereof.

According to another embodiment, a diester or diester mixture required according to the invention may be obtained by an esterification reaction between diethylene glycol and nonanoic acid.

According to another embodiment, a diester or diester mixture required according to the invention may be obtained by an esterification reaction between neopentyl glycol and nonanoic acid, isononanoic acid, 2-ethylhexanoic acid and mixtures thereof.

The diester of formula (I) required according to the invention advantageously has a kinematic viscosity measured at 40° C. according to standard ASTM D445 between 5 and 18 mm$^2$/s, preferably between 8 and 15 mm$^2$/s, and/or a kinematic viscosity measured at 100° C. according to standard ASTM D445 between 1.5 and 9.3 mm$^2$/s, preferably between 2 and 4 mm$^2$/s.

The diester of formula (I) required according to the invention advantageously has a thermal conductivity measured at 30° C. according to standard ASTM D7896, greater than or equal to 100 mW/Km, preferably between 110 and 180 mW/Km and/or a thermal conductivity measured at 130° C. according to standard ASTM D7896, greater than or equal to 90 mW/Km, preferably between 95 and 160 mW/Km.

The diester of formula (I) required according to the invention advantageously has a heat capacity measured at 20° C. according to standard ASTM E1269, greater than or equal to 1.5 J/K, preferably between 1.8 and 2.1 J/K and/or a heat capacity measured at 80° C. according to standard ASTM E1269, greater than or equal to 2 J/K, preferably between 2.0 and 2.8 J/K.

The diester of formula (I) required according to the invention advantageously has an evaporation time of 20 wt % of said ester, measured according to standard ASTM D6375, greater than or equal to 400 seconds, preferably between 410 and 600 seconds.

It is understood in the context of the present invention that the diester of formula (I) as defined above may be in the form of a mixture of diesters of formula (I) as defined above.

According to the present invention, the diester or diesters of formula (I) may be present in a content between 1 and 30 wt %, relative to the total weight of the composition employed according to the invention, in particular between 5 and 30 wt %, preferably between 5 and 25 wt %, and more particularly between 10 and 25 wt %.

In terms of formulation of a composition employed according to the present invention, all the methods known by a person skilled in the art may be used for this additive treatment of oil with at least one ester of dipropylene glycol.

The diester or diesters of formula (I) as defined above may be incorporated directly in the base lubricant oil.

According to a variant embodiment, a composition employed according to the invention is formed, in other words consists of a mixture of:
a base oil, or mixture of base oils, having a kinematic viscosity measured at 100° C. according to standard ASTM D445 from 1.5 to 8 mm$^2$/s; and
a diester of formula (I) as defined above.

Alternatively, a composition employed according to the invention may further comprise one or more additional additives as defined more precisely hereinafter.

Additional Additives

According to a variant of the invention, a lubricant composition employed according to the present invention may further comprise at least one additive modulating the properties of the base oil.

It is understood that the nature and the amount of additives used are selected so as not to affect the combined properties of cooling and lubricant power of the composition employed according to the invention.

Hydrocarbon-Containing Fluid

A composition employed according to the invention may moreover use at least one hydrocarbon-containing fluid having a boiling point greater than or equal to 50° C.

A hydrocarbon-containing fluid of this kind preferably has a boiling point between 50 and 350° C., in particular between 60 and 250° C., and even more particularly between 80 and 200° C.

Preferably, the hydrocarbon-containing fluid has a content of carbon of biological origin greater than or equal to 90 wt %, relative to the total weight of the hydrocarbon-containing fluid.

In the sense of the present invention, "hydrocarbon-containing fluid" means any fluid comprising molecules of saturated or unsaturated, linear hydrocarbons, which may also comprise aromatic or cyclic groups, or also heteroatoms.

Advantageously, the hydrocarbon-containing fluid is fully saturated. Preferably, the components of the hydrocarbon-containing fluid are selected from isoparaffins comprising 12 to 30 carbon atoms, preferably 13 to 19 carbon atoms and more preferably 14 to 18 carbon atoms.

According to one embodiment, the hydrocarbon-containing fluid comprises alkanes, or linear molecules of saturated hydrocarbons with a noncyclic chain, in particular comprising between 12 and 30 carbon atoms, in a content between 80 and 100 wt %, relative to the total weight of the hydrocarbon-containing fluid, or even between 90 and 100 wt %, and for example between 95 and 100 wt %.

In the context of the present invention, "paraffins" denote straight-chain hydrocarbons (also called "normal paraffins") and/or branched-chain hydrocarbons (also called "isoparaffins").

As heteroatoms, in the context of the present invention, we may notably mention nitrogen and oxygen.

According to a particular embodiment of the invention, the hydrocarbon-containing fluid comprises from 90 to 100 wt % of isoparaffins, a content of normal paraffins from 0 to 10 wt % and a content of carbons of biological origin greater than or equal to 90 wt % relative to the total weight of the hydrocarbon-containing fluid.

The hydrocarbon-containing fluid advantageously comprises a content greater than or equal to 90 wt %, in particular greater than or equal to 95 wt %, and even more advantageously greater than or equal to 98 wt % of isoparaffins, relative to the total weight of hydrocarbon-containing fluid.

According to one embodiment, the isoparaffins present in the hydrocarbon-containing fluid comprise from 12 to 30 carbon atoms, preferably from 13 to 19 carbon atoms and even more preferably from 14 to 18 carbon atoms.

The hydrocarbon-containing fluid advantageously comprises a content of normal paraffins less than or equal to 10 wt %, preferably less than or equal to 5 wt % and even more preferably less than or equal to 2 wt %, relative to the total weight of the hydrocarbon-containing fluid.

The isoparaffins are advantageously noncyclic isoparaffins. Preferably, the hydrocarbon-containing fluid has a weight ratio of isoparaffins to normal paraffins of at least 12:1, preferably at least 15:1 and more preferably at least 20:1. According to an even more particular embodiment, the hydrocarbon-containing fluid does not comprise normal paraffins.

The hydrocarbon-containing fluid preferably comprises a content by weight of isoparaffins from 90 to 100% and a content of normal paraffins from 0 to 10%, preferably from 95 to 100% of isoparaffins selected from alkanes comprising from 12 to 30 carbon atoms, preferably from 12 to 24 carbon atoms, more preferably from 12 to 22 carbon atoms.

According to a particular embodiment, the hydrocarbon-containing fluid comprises a majority, i.e. more than 90 wt %, of molecules having 14 to 18 carbon atoms, such as isoparaffins.

According to another embodiment, the hydrocarbon-containing fluid comprises from 60 to 95 wt %, preferably from 80 to 98 wt %, of isoparaffins selected from the group consisting of $C_{15}$ isoparaffins, $C_{16}$ isoparaffins, $C_{17}$ isoparaffins, $C_n$ isoparaffins and mixtures of two or more of them.

According to one embodiment, the hydrocarbon-containing fluid comprises:
  isoparaffins having 15 carbon atoms and isoparaffins having 16 carbon atoms in a total amount from 80 to 98 wt %, relative to the total weight of the hydrocarbon-containing fluid, or
  isoparaffins having 16 carbon atoms, isoparaffins having 17 carbon atoms and isoparaffins having 18 carbon atoms in a total amount from 80 to 98 wt %, relative to the total weight of the hydrocarbon-containing fluid, or
  isoparaffins having 17 carbon atoms and isoparaffins having 18 carbon atoms in a total amount from 80 to 98 wt %, relative to the total weight of the hydrocarbon-containing fluid.

According to a preferred embodiment of the invention, the hydrocarbon-containing fluid comprises isoparaffins having 17 carbon atoms and isoparaffins having 18 carbon atoms in a total amount from 80 to 98 wt %, relative to the total weight of the hydrocarbon-containing fluid.

Examples of preferred hydrocarbon-containing fluids are those comprising:
  from 30 to 70 wt % of $C_{15}$ isoparaffins and from 30 to 70 wt % of $C_{16}$ isoparaffins, preferably from 40 to 60 wt % of $C_{15}$ isoparaffins and from 35 to 55 wt % of $C_{16}$ isoparaffins, relative to the total weight of the hydrocarbon-containing fluid,
  from 5 to 25% of $C_{15}$ isoparaffins, from 30 to 70% of $C_{16}$ isoparaffins and from 10 to 40% of $C_{17}$ isoparaffins, preferably from 8 to 15% of $C_{15}$ isoparaffins, from 40 to 60% of $C_{16}$ isoparaffins and from 15 to 25% of $C_{17}$ isoparaffins, relative to the total weight of the hydrocarbon-containing fluid,
  from 5 to 30% of $C_{17}$ isoparaffins and from 70 to 95% of $C_{18}$ isoparaffins, preferably from 10 to 25% of $C_{17}$ isoparaffins and from 70 to 90% of $C_{18}$ isoparaffins, relative to the total weight of the hydrocarbon-containing fluid.

The hydrocarbon-containing fluid preferably comprises a content by weight of naphthenic compounds less than or equal to 3%, preferably less than or equal to 1%, more preferably less than or equal to 0.5% and even more preferably less than or equal to 500 ppm, or even 100 ppm or 50 ppm.

According to another embodiment, the hydrocarbon-containing fluid comprises a content by weight of isoparaffins from 90 to 100%, a content by weight of normal paraffins from 0 to 10% and a content by weight of naphthenic compounds less than or equal to 1%. Preferably the hydrocarbon-containing fluid comprises a content by weight from 95 to 100% of isoparaffins, from 0 to 5% of normal paraffins and a content by weight of naphthenic compounds less than or equal to 0.5%. More preferably it comprises a content by weight from 98% to 100% of isoparaffins, from 0 to 2% of normal paraffins and a content by weight of naphthenic compounds less than or equal to 100 ppm.

The hydrocarbon-containing fluid is advantageously free from aromatic compounds. "Free from" means a content by weight of aromatic compounds less than or equal to 500 ppm, preferably less than or equal to 300 ppm, preferably less than or equal to 100 ppm, more preferably less than or equal to 50 ppm and advantageously less than or equal to 20 ppm measured for example by UV spectrometry.

The content by weight of isoparaffins, normal paraffins, naphthenic compounds and/or aromatics in the hydrocarbon-containing fluid can be determined by methods familiar to a person skilled in the art. We may mention, as a nonlimiting example, a method using gas chromatography.

According to another embodiment, the hydrocarbon-containing fluid comprises a content by weight of isoparaffins from 90 to 100%, a content by weight of normal paraffins from 0 to 10%, a content by weight of naphthenic compounds less than or equal to 1% and a content by weight of aromatic compounds less than or equal to 500 ppm. Preferably the hydrocarbon-containing fluid comprises a content by weight from 95 to 100% of isoparaffins, from 0 to 5% of normal paraffins, a content by weight of naphthenic compounds less than or equal to 0.5% and a content by weight of aromatic compounds less than or equal to 300 ppm, preferably below 100 ppm, preferably below 50 ppm and advantageously below 20 ppm. Also preferably, the hydrocarbon-containing fluid comprises a content by weight from 95 to 100% of isoparaffins, from 0 to 5% of normal paraffins and a content by weight of aromatic compounds less than or equal to 100 ppm. More preferably it comprises a content by weight from 98% to 100% of isoparaffins, from 0 to 2% of normal paraffins, a content by weight of naphthenic compounds less than or equal to 100 ppm and a content by weight of aromatic compounds less than or equal to 100 ppm.

The hydrocarbon-containing fluid also preferably has an extremely low content by weight of sulfur-containing compounds, typically less than or equal to 5 ppm, preferably less than or equal to 3 ppm and more preferably less than or equal to 0.5 ppm at a level too low to be detected with conventional low sulfur content analyzers.

The hydrocarbon-containing fluid also preferably has a flash point greater than or equal to 110° C., preferably greater than or equal to 120° C. and more preferably greater than or equal to 140° C. according to standard EN ISO 2719.

A high flash point, typically above 110° C., among other things makes it possible on the one hand to overcome the problems of safety during storage and transport by avoiding overly sensitive flammability of the hydrocarbon-containing fluid.

The hydrocarbon-containing fluid also preferably has a vapor pressure at 20° C. less than or equal to 0.01 kPa.

According to one embodiment, the hydrocarbon-containing fluid also preferably has a flash point greater than or equal to 110° C. according to standard EN ISO 2719 and a vapor pressure at 20° C. less than or equal to 0.01 kPa. Preferably the hydrocarbon-containing fluid has a flash point greater than or equal to 120° C. and a vapor pressure at 20° C. less than or equal to 0.01 kPa. More preferably, it has a flash point greater than or equal to 140° C. and a vapor pressure at 20° C. less than or equal to 0.01 kPa.

The hydrocarbon-containing fluid has boiling points, a flash point and a vapor pressure allowing the problems of flammability, odor and volatility to be overcome.

Moreover, the hydrocarbon-containing fluid preferably has a kinematic viscosity at 40° C. less than or equal to 5 cSt, preferably less than or equal to 4 cSt and more preferably less than or equal to 3.5 cSt according to standard EN ISO 3104.

The hydrocarbon-containing fluid may be obtained by any method known by a person skilled in the art.

Generally the hydrocarbon-containing fluid is a hydrocarbon-containing cut that is obtained from biomass conversion.

"Obtained from biomass conversion" means, in the context of the present invention, a hydrocarbon-containing cut produced from raw materials of biological origin.

According to one embodiment, the hydrocarbon-containing fluid comprises:
  a content by weight of isoparaffins from 95 to 100% and preferably from 98% to 100% relative to the total weight of the hydrocarbon-containing fluid, and
  a content by weight of normal paraffins less than or equal to 5% and preferably less than or equal to 2% relative to the total weight of the hydrocarbon-containing fluid; and
  a content by weight of naphthenic compounds less than or equal to 0.5% and preferably less than or equal to 100 ppm relative to the total weight of the hydrocarbon-containing fluid; and
  a content by weight of aromatic compounds less than or equal to 300 ppm, preferably less than or equal to 100 ppm, more preferably less than or equal to 50 ppm and advantageously less than or equal to 20 ppm, relative to the total weight of the hydrocarbon-containing fluid.

According to a particular embodiment, the hydrocarbon-containing fluid comprises a content by weight of isoparaffins from 98% to 100%, relative to the total weight of the hydrocarbon-containing fluid, and a kinematic viscosity at 40° C. less than or equal to 5 cSt, preferably less than or equal to 4 cSt and preferably less than or equal to 3.5 cSt.

Radical Inhibitor

A lubricant composition employed according to the invention may further comprise at least one radical inhibitor.

Said radical inhibitors are known per se by a person skilled in the art and may have various chemical natures and may in particular belong to different chemical classes.

Among the radical inhibitors, we may notably mention the phosphorus-containing radical inhibitors.

Among the phosphorus-containing radical inhibitors, a distinction is made between the compounds for which the phosphorus is a P(V) or pentavalent phosphorus, in particular phosphates such as triethyl phosphate, trimethyl phosphate, alkyl phosphates optionally fluorinated or else aryl phosphates, phosphazenes such as hexamethoxy-cyclotriphosphazene, and the compounds for which the phosphorus is a P(III) or trivalent phosphorus, in particular phosphites such as tris(2,2,2-trifluoroethyl)phosphite.

Other Additives

According to a variant of the invention, a composition employed according to the invention may further comprise additives that modulate the properties of the base oil.

Such additives may be selected from friction modifiers, detergents, antiwear additives, extreme-pressure additives, dispersants, antioxidants, pour-point improvers, antifoaming agents and mixtures thereof.

These additives may be introduced individually and/or in the form of a mixture like those already commercially available for the formulations of commercial lubricants for vehicle engines, with performance levels as defined by the ACEA (European Automobile Manufacturers' Association) and/or the API (American Petroleum Institute), which are familiar to a person skilled in the art.

Antiwear additives and extreme-pressure additives protect the rubbing surfaces by forming a protective film that is adsorbed on said surfaces.

There is a great variety of antiwear additives. Preferably, for the composition employed according to the invention, the antiwear additives are selected from thiophosphate additives such as metal alkylthiophosphates, in particular zinc alkylthiophosphates, and more specifically zinc dialkyldithiophosphates or ZnDTP. The preferred compounds are of formula $Zn((SP(S)(OR^2)(OR^3))_2$, in which $R^2$ and $R^3$, which may be identical or different, represent independently an alkyl group, preferably an alkyl group comprising from 1 to 18 carbon atoms.

The amine phosphates are also antiwear additives that may be used in a composition employed according to the invention. However, the phosphorus supplied by these additives may act as a poison of automobile catalytic systems, as these additives generate ash. These effects can be minimized by partially replacing the amine phosphates with additives that do not supply phosphorus, such as, for example, polysulfides, notably sulfur-containing olefins.

A lubricant composition employed according to the invention may comprise from 0.01 to 6 wt %, preferably from 0.05 to 4 wt %, more preferably from 0.1 to 2 wt % of antiwear additives and extreme-pressure additives, by mass relative to the total weight of composition.

According to a particular embodiment, a lubricant composition employed according to the invention is free from antiwear additives and extreme-pressure additives. In particular, a lubricant composition employed according to the invention is advantageously free from phosphate-containing additives.

A lubricant composition employed according to the invention may comprise at least one friction modifying additive. The friction modifying additive may be selected from a compound supplying metallic elements and an ash-free compound. Among the compounds supplying metallic elements, we may mention complexes of transition metals such as Mo, Sb, Sn, Fe, Cu, Zn whose ligands may be hydrocarbon compounds comprising oxygen, nitrogen, sulfur or phosphorus atoms. The ash-free friction modifying additives are generally of organic origin and may be selected from monoesters of fatty acids and polyols, alkoxylated amines, alkoxylated fatty amines, fatty epoxides, borate fatty epoxides; fatty amines or fatty acid glycerol esters. According to the invention, the fatty compounds comprise at least one hydrocarbon group comprising from 10 to 24 carbon atoms.

A lubricant composition employed according to the invention may comprise from 0.01 to 2 wt % or from 0.01 to 5 wt %, preferably from 0.1 to 1.5 wt % or from 0.1 to 2 wt % of friction modifying additive, relative to the total weight of the composition.

Advantageously, a lubricant composition employed according to the invention is free from friction modifying additive.

A lubricant composition employed according to the invention may comprise at least one antioxidant additive.

The antioxidant additive generally makes it possible to delay the degradation of the composition in service. This degradation may notably be reflected in the formation of deposits, the presence of sludge or an increase in viscosity of the composition.

The antioxidant additives notably act as radical inhibitors or destroyers of hydroperoxides. Among the antioxidant additives commonly used, we may mention antioxidant additives of the phenolic type, antioxidant additives of the amino type, and thiophosphate antioxidants. Certain of these antioxidant additives, for example the thiophosphate antioxidants, may generate ash. The phenolic antioxidants may be ash-free or may be in the form of neutral or basic metal salts. The antioxidant additives may notably be selected from sterically hindered phenols, sterically hindered phenol esters and sterically hindered phenols comprising a thioether bridge, diphenylamines, diphenylamines substituted with at least one $C_1$-$C_{12}$ alkyl group, N,N'-dialkyl aryl diamines and mixtures thereof.

Preferably, according to the invention, the sterically hindered phenols are selected from compounds comprising a phenol group, of which at least one carbon vicinal of the carbon bearing the alcohol function is substituted with at least one $C_1$-$C_{10}$ alkyl group, preferably a $C_1$-$C_6$ alkyl group, preferably a $C_4$ alkyl group, preferably with the tert-butyl group.

The amine compounds are another class of antioxidant additives that may be used, optionally in combination with the phenolic antioxidants. Examples of amine compounds are aromatic amines, for example aromatic amines of formula $NR^4R^5R^6$ in which $R^4$ represents an aliphatic group or an aromatic group, optionally substituted, $R^5$ represents an aromatic group, optionally substituted, $R^6$ represents a hydrogen atom, an alkyl group, an aryl group or a group of formula $R'S(O)_zR^8$ in which $R^7$ represents an alkylene group or an alkenylene group, $R^8$ represents an alkyl group, an alkenyl group or an aryl group and z represents 0, 1 or 2.

Sulfurized alkyl phenols or the alkali metal and alkaline earth salts thereof may also be used as antioxidant additives.

Another class of antioxidant additives is the copper compounds, for example the copper thio- or dithiophosphates, the salts of copper and carboxylic acids, copper dithiocarbamates, sulfonates, phenolates, and acetylacetonates. The salts of copper I and II, the salts of succinic acid or anhydride may also be used.

A lubricant composition employed according to the invention may contain all types of antioxidant additives known by a person skilled in the art.

Advantageously, a lubricant composition employed according to the invention comprises at least one ash-free antioxidant additive.

A lubricant composition employed according to the invention may comprise from 0.5 to 2 wt % of at least one antioxidant additive, relative to the total weight of the composition.

A lubricant composition employed according to the invention may also comprise at least one detergent additive.

The detergents generally make it possible to reduce the formation of deposits on the surface of metal parts by dissolving the by-products of oxidation and combustion.

The detergents usable in a lubricant composition employed according to the invention are generally familiar to a person skilled in the art. The detergents may be anionic compounds comprising a long lipophilic hydrocarbon chain and a hydrophilic head. The associated cation may be a metal cation of an alkali metal or alkaline-earth metal.

The detergents are preferably selected from the salts of alkali metals or of alkaline-earth metals of carboxylic acids, sulfonates, salicylates, naphthanates, as well as phenolates. The alkali metals and alkaline-earth metals are preferably calcium, magnesium, sodium or barium.

These metal salts generally comprise the metal in stoichiometric quantity or in excess, therefore in an amount greater than the stoichiometric quantity. They are then overbased detergents; the metal in excess giving the detergent additive the overbased character is then generally in the form of a metal salt that is insoluble in the oil, for example a carbonate, a hydroxide, an oxalate, an acetate, a glutamate, preferably a carbonate.

A lubricant composition employed according to the invention may for example comprise from 2 to 4 wt % of detergent, relative to the total weight of the composition.

A lubricant composition employed according to the invention may also comprise at least one pour-point depressant.

By slowing down the formation of paraffin crystals, the pour-point depressants generally improve the composition's low-temperature behavior.

As examples of pour-point depressants, we may mention alkyl polymethacrylates, polyacrylates, polyaryl amides, polyalkyl phenols, polyalkyl naphthalenes, alkylated polystyrenes.

A lubricant composition employed according to the invention may also comprise at least one dispersant.

The dispersant may be selected from Mannich bases, succinimides and derivatives thereof.

A lubricant composition employed according to the invention may for example comprise from 0.2 to 10 wt % of dispersant, relative to the total weight of the composition.

It is up to a person skilled in the art to adjust the proportions of the various constituents of the composition, and the various additives defined above, to meet the viscosity required according to the invention, and optionally the density of the composition.

Application

As stated above, a composition as defined according to the invention may be employed, owing to its combined properties in terms of lubrication and cooling, both as a fluid for lubricating the motor and the transmission, and as a cooling fluid for a propulsion system of an electric or hybrid vehicle, and more particularly the motor, the power electronics and the batteries.

Thus, according to one of its aspects, the present invention relates to the use, as a lubrication fluid and cooling fluid for a propulsion system of an electric or hybrid vehicle, of a composition comprising:

(i) at least one base oil, (ii) at least one diester of formula (I), different than the base oil (i):

$$R^a\text{—}C(O)\text{—}O\text{—}([C(R)_2]_n\text{—}O)_s\text{—}C(O)\text{—}R^b \qquad (I)$$

in which:
- R represent, independently of one another, a hydrogen atom or a $(C_1-C_5)$alkyl group, linear or branched, in particular a methyl, ethyl or propyl group, notably methyl;
- s has a value of 1 or 2;
- n has a value of 1, 2 or 3; it being understood that when s is different from 1, n may be identical or different; and
- $R^a$ and $R^b$, which may be identical or different, represent independently of one another, hydrocarbon groups, saturated or unsaturated, linear or branched, having a linear chain with 2 to 11 carbon atoms, preferably with 3 to 8 carbon atoms;

provided that when s has a value of 2 and n, which are identical, have a value of 2, at least one of the groups R represents a $(C_1-C_5)$alkyl group, linear or branched; and provided that, when s has a value of 1 and n has a value of 3, at least one of the groups R bound to the carbon in the beta position of the oxygen atoms of the ester functions represents a hydrogen atom.

"Cooling fluid" means, in the sense of the present invention, a fluid able to dissipate the heat generated by a propulsion system of an electric or hybrid vehicle. More precisely, such a fluid is characterized by an enhanced thermal absorption capacity while it is in contact with a part that is being heated.

In particular, a composition employed according to the invention makes it possible to optimize the heat exchanges with the propulsion system of an electric or hybrid vehicle. Advantageously, it has a heat capacity measured at 50° C. and at atmospheric pressure above 1.8 kJ/kg/K, preferably above 2 kJ/kg/K.

Advantageously, the composition employed according to the invention is brought into contact with the battery by any implementation that allows direct contact between the cells of the battery and said composition, in particular by immersion or semi-immersion.

Alternatively, the lubricant composition employed according to the invention is advantageously brought into direct contact with the batteries by methods described hereunder.

As batteries suitable for the propulsion systems of an electric or hybrid vehicle, we may mention Li-ion batteries or nickel-cadmium batteries.

In particular, the invention relates to the use of a composition as defined above for lubricating and cooling a propulsion system of an electric or hybrid vehicle.

Figure 1:
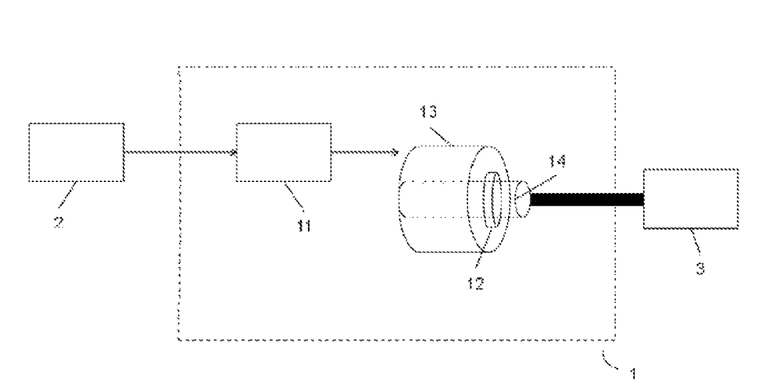
FIG. 1 is a schematic representation of an electric or hybrid propulsion system.

An electric motor is typically supplied by an electric battery (2). Lithium-ion batteries are the most widely used in the field of electric vehicles. The development of batteries that are more and more powerful and whose size is smaller and smaller leads to the problem of cooling of said batteries. In fact, once the battery exceeds temperatures of the order of 50 to 60° C., there is a high risk of ignition, or even explosion, of the battery. There is also a need to keep the battery at a temperature above about 0° C. for optimal operation of the battery.

As shown schematically in FIG. 1, the propulsion system of an electric or hybrid vehicle notably comprises the electric motor part (1). The latter typically comprises power electronics (11) connected to a stator (13) and a rotor (14).

The stator comprises coils, in particular copper coils, which are supplied alternately with an electric current. This makes it possible to generate a rotating magnetic field. The rotor itself comprises coils, permanent magnets or other magnetic materials, and is caused to rotate by the rotating magnetic field.

The power electronics (11), the stator (13) and the rotor (14) of a propulsion system (1) are components of complex structure that generate a large amount of heat during operation of the motor. It is therefore imperative to provide cooling of the electric motor and the power electronics.

Moreover, the bearing (12), generally incorporated between the stator (13) and the rotor (14), is subjected to high mechanical stresses and poses problems of fatigue wear. It is therefore necessary to lubricate the bearing in order to increase its service life.

Thus, a composition as described above makes it possible to lubricate the transmission, in particular the reduction gearing, in an electric or hybrid vehicle.

It will be understood that the uses described above may be combined, and a composition as described above is usable both as a lubricant and as a cooling fluid for the motor, the battery and the transmission of an electric or hybrid vehicle.

Thus, the invention relates to the use of a composition as described above for cooling the battery, the motor, and the power electronics, for lubricating the motor and the transmission and for fire protection of a propulsion system of an electric or hybrid vehicle, and notably the battery.

In particular, such a composition makes it possible to cool the power electronics and/or the rotor and/or the stator of the electric motor. It can also provide lubrication of the bearings located between the rotor and the stator of an electric motor of an electric or hybrid vehicle.

Thus, the invention offers the advantage of allowing the use of a single composition combining the properties of cooling and lubrication of the propulsion system of an electric or hybrid vehicle as a whole.

Furthermore, the use of at least one diester of formula (I) as defined above in at least one base oil makes it possible to increase the flammability temperature of the base oil.

Thus, the invention also relates to the use of at least one diester of formula (I) in a composition comprising at least one base oil, for improving the non-flammable properties of the composition.

The invention further relates to a method of cooling and lubricating a propulsion system of an electric or hybrid vehicle comprising at least one step of bringing at least one mechanical component of said system, notably at least one battery cell, in particular a lithium-ion or nickel-cadmium battery, into contact with a composition as defined above.

According to a particular embodiment, the contacting step consists of immersion or semi-immersion, static or circulating, of the battery in said composition or else injection of said composition onto the surface of the battery.

All of the features and preferences described for the lubricant composition used according to the invention as well as for the uses thereof also apply to this method.

The cooling by a lubricant composition defined according to the invention may be implemented by any method known by a person skilled in the art.

The battery may be immersed or semi-immersed, static or circulating, in said composition.

As examples of bringing into direct contact, we may mention cooling by injection, jet, by spraying or else by formation of a mist from the composition employed according to the invention under pressure and by gravity on the battery.

Advantageously, the composition is injected by jet at quite high pressure in the zones of the propulsion system that are to be cooled. Advantageously, the shearing resulting from this injection makes it possible to reduce the viscosity of the fluid at the level of the injection zone, relative to the kinematic viscosity at rest, and thus further increase the cooling potential of the composition.

Thus, the present invention also relates to a method of cooling and lubricating a propulsion system of an electric or hybrid vehicle as defined above in which the mechanical component is at least one battery, in immersion or semi-immersion, static or circulating, in said composition, or said composition is brought into direct contact with the batteries by injection, jet, by spraying or else by formation of a mist from said composition under pressure and by gravity on the battery.

Moreover, oil circulating systems commonly used in electric motors may be used, for example as described in document WO 2015/116496.

EXAMPLES

Example 1: Measurement of the Rheological and Thermal Properties of Diesters According to the Invention Measurement of the Rheological Properties:

The rheological properties of the esters are quantified by measuring their kinematic viscosities at 40° C. (KV40) and at 100° C. (KV100), expressed in mm$^2$/s, determined according to standard ASTM D445.

Measurement of the Thermal Properties:

The thermal properties of the esters can be evaluated by measuring their thermal conductivity and their heat capacity (or calorific capacity).

Thermal conductivity is measured according to standard ASTM D7896.

Heat capacity is measured according to standard ASTM E1269.

Nature of the Diesters

The thermal and rheological properties were measured for the diesters obtained by esterification between the alcohols and the acids indicated in Table 1 below.

TABLE 1

Nature of the diesters tested

| Ester | Alcohol | Acid |
|---|---|---|
| E1 | Dipropylene glycol (DPG) | Nonanoic acid/dodecanoic acid (50/50) |
| E2 | DPG | Nonanoic acid |
| E3 | Diethylene glycol (DEG) | Nonanoic acid |
| E4 | Neopentyl glycol (NPG) | Nonanoic acid |
| E5 | NPG | Isononanoic acid |
| E6 | NPG | 2-Ethylhexanoic acid |

Results

The results obtained are presented in Table 2 below

TABLE 2

Rheological and thermal properties of the diesters

| Ester | KV40 (mm$^2$/s) | KV100 (mm$^2$/s) | λ at 30° C. (mW/Km) | λ at 130° C. (mW/Km) | Cp at 20° C. (J/K) | Cp at 80° C. (J/K) |
|---|---|---|---|---|---|---|
| E1 | 11.7 | 3.2 | 150.5 | 131.0 | 1.930 | 2.086 |
| E2 | 9.1 | 2.7 | 147.1 | 127.0 | 1.900 | 2.070 |
| E3 | 8.6 | 2.6 | 154.9 | 133.7 | — | 2.150 |
| E4 | 8.7 | 2.6 | 141.8 | 123.2 | 1.970 | 2.180 |
| E5 | 13.2 | 3.2 | 113.2 | 99.6 | 1.870 | 2.100 |
| E6 | 7.5 | 2.1 | 128.2 | 111.2 | 1.837 | 2.040 |

It is clear from the above results that the diesters of formula (I) according to the invention have rheological properties and values of thermal conductivity and of heat capacity that allow them to be used in a lubricant composition for purposes of lubrication and cooling of the parts of a propulsion system of an electric or hybrid vehicle.

Example 2: Measurement of Volatility of Diesters According to the Invention and not According to the Invention Method of Measurement The volatility of the diesters is quantified by thermogravimetric analysis (TGA), more particularly carried out according to standard ASTM D6375.

The diester to be tested is heated quickly to a temperature between 247° C. and 249° C. and then held at this temperature. The apparatus for thermogravimetric measurement records the percentage weight loss of the sample as a function of time, connected with its evaporation.

The results obtained correspond to the time taken, expressed in seconds, for 20% of the initial ester to be evaporated. The longer the time, the slower the evaporation of the product, and therefore the longer the life of the lubricant.

Nature of the Diester

The diesters E2 and E3 defined above, according to the invention, were tested, as well as two diesters not according to the invention, E8 and E9.

The diesters E8 and E9 are obtained by esterification between triethylene glycol and heptanoic acid and 2-ethylhexanoic acid, respectively.

Results

The results obtained are presented in Table 3 below

TABLE 3

Volatility of the diesters

| Ester | Time taken for evaporation of 20% of product(s) |
|---|---|
| E2 (invention) | 461 |
| E3 (invention) | 490 |
| E8 (not according to the invention) | 361 |
| E9 (not according to the invention) | 390 |

The diesters E2 and E3, according to the invention, have longer evaporation times than the diesters E8 and E9 not according to the invention.

These results demonstrate that a diester of formula (I) according to the invention endows the composition in which it is used with advantageous properties, in particular of lubrication and cooling, over a longer time of use, thereby extending the oil-changing interval.

The invention claimed is:

1. A method for cooling and lubricating a propulsion system of an electric or hybrid vehicle, comprising a step of bringing at least one mechanical component of said system into contact with a composition comprising:
   (i) from 60% to 99.5% by weight of at least one synthetic base oil, based on a total weight of the composition, the synthetic base oil having a kinematic viscosity of from 1.5 to 8 mm²/s, measured at 100° C. according to standard ASTM D445; and
   (ii) at least one diester of formula (I), different than the synthetic base oil (i):

(I)

in which:
      R represents, independently of one another, a hydrogen atom or a linear or branched ($C_1$-$C_5$)alkyl group;
      s has a value of 1 or 2;
      n has a value of 1, 2 or 3; wherein, when s is different from 1, n may be identical or different; and
      $R^a$ and $R^b$, which may be identical or different, represent independently of one another, saturated or unsaturated, linear or branched, hydrocarbon groups having a linear chain with 2 to 11 carbon atoms,
      wherein when s has a value of 1 and n has a value of 3, at least one of the R groups bound to the carbon in the beta position of the oxygen atoms of the ester groups represents a hydrogen atom.

2. The method as claimed in claim 1, in which the diester of formula (I) is a diester of formula (I'):

(I')

in which:
      R and R' represent, independently of one another, a hydrogen atom or a linear or branched ($C_1$-$C_5$)alkyl group;
      s has a value of 1 or 2;
      n has a value of 2;
      m has a value of 2;
      $R^a$ and $R^b$, which may be identical or different, represent independently of one another, saturated or unsaturated, linear or branched, hydrocarbon groups having a linear chain with 2 to 11 carbon atoms;
      wherein, when s has a value of 2, at least one of the groups R or R' represents a linear or branched ($C_1$-$C_5$)alkyl group.

3. The method as claimed in claim 1, wherein the diester or diesters of formula (I) are present in an amount ranging from 1 to 30 wt %, relative to the total weight of the composition.

4. The method as claimed in claim 1, in which the composition further comprises at least one additive chosen from hydrocarbon-containing fluids having a boiling point greater than or equal to 50° C., radical inhibitors, friction modifiers, detergents, antiwear additives, extreme-pressure additives, dispersants, antioxidants, pour-point improvers, antifoaming agents, or mixtures thereof.

5. The method as claimed in the claim 1, wherein said at least one mechanical component is a battery, and the battery is immersed or semi-immersed, static or circulating, in said composition.

6. The method as claimed in claim 1, wherein said at least one mechanical component is a battery, and the composition is brought into direct contact with the battery by injection, jet, spraying, or misting.

7. The method as claimed in claim 1, wherein the synthetic base oil has a kinematic viscosity, measured at 100° C. according to standard ASTM D445, from 1.5 to 2.1 mm²/s.

8. The method as claimed in claim 1, wherein the composition comprises from 90% to 97% by weight of the synthetic base oil.

9. The method as claimed in claim 1, in which the diester or diesters of formula (I) are present in an amount ranging from 10 to 25 wt %, relative to the total weight of the composition.

10. The method as claimed in claim 1, wherein at least one mechanical component of said system is at least one battery cell.

11. The method as claimed in claim 1, wherein at least one mechanical component of said system is a lithium-ion or nickel-cadmium battery.

12. A method for extending the oil-changing interval of a propulsion system of an electric or hybrid vehicle comprising a step of adding into a composition comprising:
   from 60% to 99.5% by weight of at least one synthetic base oil, based on a total weight of the composition, the synthetic base oil having a kinematic viscosity of from 1.5 to 8 mm²/s, measured at 100° C. according to standard ASTM D445; and
   a diester of formula (I):

(I)

in which:
      R represents, independently of one another, a hydrogen atom or a linear or branched ($C_1$-$C_5$)alkyl group;
      s has a value of 1 or 2;
      n has a value of 1, 2 or 3; wherein, when s is different from 1, n may be identical or different; and
      $R^a$ and $R^b$, which may be identical or different, represent independently of one another, saturated or unsaturated, linear or branched, hydrocarbon groups having a linear chain with 2 to 11 carbon atoms,
      wherein when s has a value of 1 and n has a value of 3, at least one of the R groups bound to the carbon in the beta position of the oxygen atoms of the ester groups represents a hydrogen atom.

13. The method as claimed in claim 12, wherein the diester of formula (I) is a diester of formula (I'):

(I')

in which:
      R and R' represent, independently of one another, a hydrogen atom or a linear or branched ($C_1$-$C_5$)alkyl group;
      s has a value of 1 or 2;
      n has a value of 2;
      m has a value of 2;
      $R^a$ and $R^b$, which may be identical or different, represent independently of one another, saturated or unsaturated, linear or branched, hydrocarbon groups having a linear chain with 2 to 11 carbon atoms;
      wherein, when s has a value of 2, at least one of the groups R or R' represents a linear or branched ($C_1$-$C_5$)alkyl group.

14. The method as claimed in claim 12, wherein the diester or diesters of formula (I) are present in an amount ranging from 1 to 30 wt %, relative to the total weight of the composition.

* * * * *